Oct. 11, 1966

R. G. BILL ETAL 3,277,656

METHODS AND APPARATUS FOR COOLING PLASTIC ARTICLES

Filed June 16, 1965

INVENTORS
R.G. BILL
C.B. HEARD JR.

BY J.B.Hoofnagle, Jr.

ATTORNEY

Oct. 11, 1966  R. G. BILL ETAL  3,277,656
METHODS AND APPARATUS FOR COOLING PLASTIC ARTICLES
Filed June 16, 1965  3 Sheets-Sheet 3

PRIOR ART DEVICE

United States Patent Office 3,277,656
Patented Oct. 11, 1966

3,277,656
METHODS AND APPARATUS FOR COOLING PLASTIC ARTICLES
Robert G. Bill, Baltimore, and Charles B. Heard, Jr., Severna Park, Md., assignors to Western Electric Company, Incorporated, New York, N.Y., a corporation of New York
Filed June 16, 1965, Ser. No. 464,341
12 Claims. (Cl. 62—63)

This invention relates to methods and apparatus for cooling extruded, elongated plastic articles and particularly relates to passing a continuous plastic article through a streamline cooling medium.

In the manufacture of elongated plastic covered articles such as an insulated wire, a continuous length of bare wire is passed through an extruder whereat an insulating jacket of plastic material is extruded about the moving wire. As the wire exits from the extruder, the insulating jacket of hot, soft, plastic material must be cooled and hardened prior to subsequent take-up of the wire onto a reel. If the jacket is not hardened substantially when subjected to pressures of the cooling medium and during the take-up, out-of-round and eccentricity deficiencies result in the finished product. In addition to the necessity of cooling the extruded insulating material, it is desirable to maintain the cooling medium in a streamline condition so that the initial pressures of the cooling medium exerted upon the insulating jacket of hot, soft material are substantially equal at all points where the medium engages the material.

Further, the cooling medium should engage the hot plastic jacket initially in a plane substantially perpendicular to the axis of the insulated wire to preclude the possibility of initially cooling the jacket along a plane which is other than perpendicular with the insulated wire axis.

Heretofore, wire with a hot, soft insulating jacket exiting from an extruder was passed through various combinations of open cooling troughs having wire entry and exit ends. A cooling medium entered each of the troughs adjacent the wire exit end and was directed toward the wire entry end, thereby arriving at the entry end of the trough with considerable velocity and turbulence. As the hot plastic jacketed wire entered the first cooling trough, the turbulent cooling medium spewed from a wire entry port in the trough, thereby presenting an initial body of cooling medium for the moving jacketed wire which engaged the jacket along a plane at an acute angle with the wire axis. This effect resulted in uneven initial cooling of the hot plastic jacket and produced a finished product having out-of-round and eccentricity deficiencies. In addition, the presence of the turbulent cooling medium within the cooling trough resulted in the application of unequal pressures upon the soft plastic jacket, thereby further increasing the deficiencies in the finished product.

In the manufacture of insulated wire using expanded plastics as the insulating jacket, the out-of-round and eccentricity deficiencies become even more apparent due to the manner in which the expansion of the insulating plastic is controlled. As the insulated product exits from the extruder, the plastic material begins the expansion process due to inherent characteristics of the material. In order to contain the expansion within desired dimensions and configuration, it is necessary to cool the heated, expanding, plastic material within a cooling medium which is streamline and which exerts equal pressures upon all points of the expanding material as the material moves through the cooling medium.

It is also important to note that the expanding plastic jacket should initially engage the cooling medium along a plane substantially perpendicular to the wire axis. If the turbulent cooling medium spews about the hot, expanding plastic as the jacketed wire approaches the entry port of the cooling trough, the uneven distribution of the spewing cooling medium outside of the cooling trough would result in an uneven expansion of the insulated jacket. Hence, to effect desired cooling of a plastic article, turbulence and cavitation in the cooling medium and the spewing of the medium from the trough article entry port must be substantially reduced to the point of extinction.

An object of this invention is new and improved methods and apparatus for cooling elongated plastic materials.

Another object of this invention is new and improved methods and apparatus for providing a streamline cooling medium through which a plastic article to be cooled is passed.

Still another object of this invention is new and improved methods and apparatus for introducing a hot plastic jacketed wire into a streamline cooling medium along a plane substantially perpendicular to the wire axis to insure even cooling about the plastic jacket and to reduce out-of-round and eccentricity deficiencies.

With these and other objects in view, the present invention contemplates continuously passing a controlled volume of cooling medium through a cooling compartment at such a rate that the cooling medium within the compartment is streamline and further directing the streamline cooling medium into a transverse flow pattern about a hot plastic article moving therethrough where the article engages the medium along a plane substantially perpendicular to the direction of movement of the article and at such a rate to preclude spewing of the meduim from the cooling compartment article entry passage.

Other objects and advantages of the invention will appear from the following detailed description of a specific embodiment thereof when read in conjunction with the appended drawings in accordance with the principles of the invention, in which.

Figure 6:
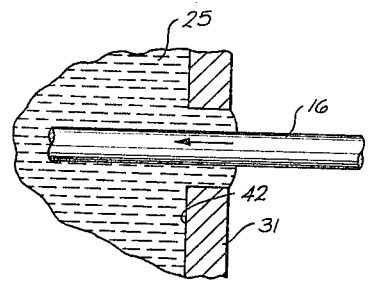
Figure 5:
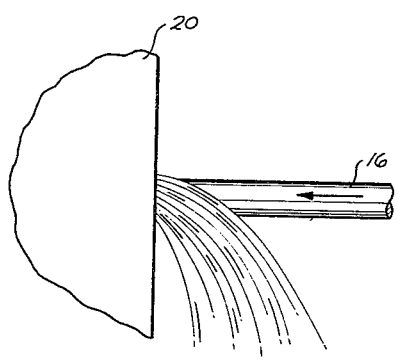
Figure 7:
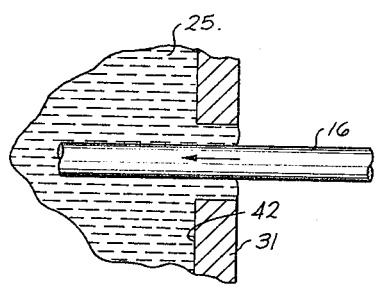
Figure 8:
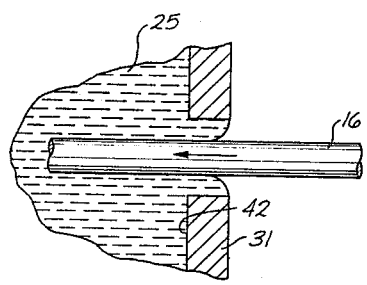

FIG. 5 is a view showing a prior art device wherein a hot jacketed wire passes from an extruder and into a cooling trough with a cooling medium spewing from the trough and presenting to the moving wire an initial plane of cooling medium which is at an acute angle to the wire axis, and FIGS. 6, 7 and 8 are partial sectional views showing the initial engagement of the plastic article with the cooling medium as controlled by various stages of adjustment in accordance with the principles of the invention.

Figure 1:
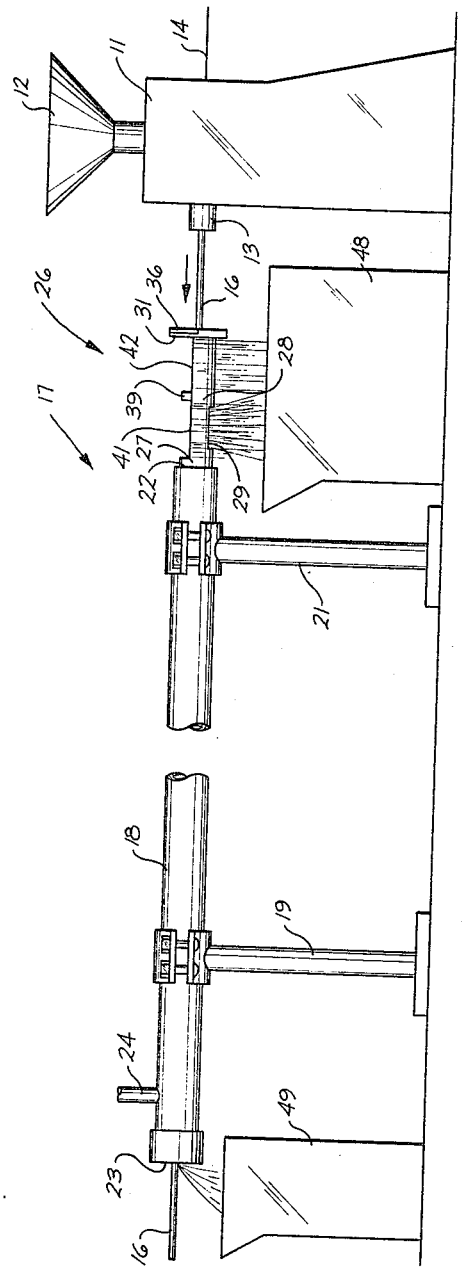
FIG. 1 is an elevational view showing an extruder positioned adjacent a cooling trough with an insulated product passing from the extruder and into a cooling chamber extending from the cooling trough in accordance with the principles of the invention.

Referring to FIG. 1, a conventional extruder 11 is provided with a hopper 12 for receiving plastic granules therein. The plastic granules are fed from the hopper 12 into the extruder 11 where the plastic pellets are plasticized and extruded from an extruder head 13 which is attached to the extruder 11. A bare wire 14 is passed through the extruder head 13 where the plasticized material is extruded about the moving wire. Movement of the bare wire 14 through the extruder head 13 produces an insulated wire 16 having an insulating jacket at an exit end of the extruder head 13.

Since the plastic pellets must be heated within the extruder 11 to place the material in a workable state, the insulated wire 16 is at a relatively high temperature as it exits from the extruder head. As the hot, insulated wire 16 exits from the extruder head 13, the soft, insulating material is still in a formable state due to the high temperature of the material even though the insulating jacket has assumed the configuration of a die (not shown) within the extruder head 13. Therefore, the insulated wire 16 must be cooled quickly before outside forces, such as those forces encountered as the wire engages a take-up reel (not shown), are projected against the insulating jacket.

Heretofore, the heated, insulated wire 16 has passed through an entry port of an open cooling trough having the cooling medium, such as water, flowing against the direction of movement of the heated, insulated wire. Since the trough was open, considerable turbulence and cavitation developed, whereby uneven pressures were exerted against the heated jacket of the insulated wire 16 as the wire entered and passed through the trough.

As shown in FIG. 5, a cooling medium 25 flowing through the open cooling trough, such as the trough 20, against the direction of movement of the insulated wire 16, spews from the wire entry port of the trough with such force that the cooling medium is unevenly distributed about the hot jacket of the wire 16 immediately prior to entry of the jacketed wire into the open cooling trough. The spewing cooling medium 25 presents an initial plane of cooling medium to the jacketed wire 16 which is displaced less than 90° from the wire axis, thereby providing uneven cooling which results in eccentricity and out-of-round deficiencies.

As the hot jacketed wire 16 enters the open cooling trough 20, as shown in FIG. 5, the turbulence and cavitation of the cooling medium 25 rushing toward the entry end from the exit end introduced unequal pressures upon the hot jacket, thereby resulting in further eccentricity and out-of-round deficiencies.

In the manufacture of the insulated wire 16 having expanded plastic jacket, the expansion process must be controlled to produce a desirable product having minimum eccentricity and out-of-round deficiencies. When the prior art device, as shown in FIG. 5, was used to cool the hot, expanding plastic jacket of the wire 16, the expansion process was difficult to control primarily due to the uneven distribution of the spewing medium 25 from the open trough 20 in presenting the cooling medium along a plane at an acute angle relative to the wire axis. Secondarily, the introduction of the expanding plastic jacket to the turbulent and cavitating cooling medium 25 within the entry end of the cooling trough 20 resulted in further difficulties in controlling the expansion process of the plastic jacket about the wire 16. In addition, deficiencies also resulted in the bubble structure of the expanded plastic jacket cooled in an open trough cooling system.

Referring again to FIG. 1, a cooling system 17 has been developed which substantially overcomes the out-of-round and eccentricity problems resulting from passing of the heated, insulated wire 16 through a turbulent and cavitating cooling medium. The cooling system 17 includes a cylindrical cooling tube 18 supported on a pair of spaced stands 19 and 21. The tube 18 is formed with a wire entry end 22 and a wire exit end 23. A cooling medium inlet 24 is formed in the tube 18 near the wire exit end 23 where the cooling medium 25, such as water, enters the inlet and is directed toward the wire entry end 22.

Figure 3:
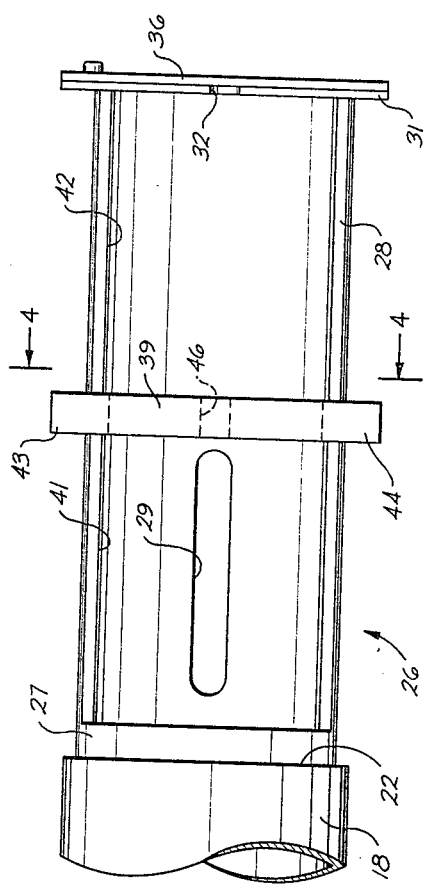
FIG. 3 is a partial plan view of FIG. 1 showing structural features of the cooling chamber in accordance with the principles of the invention.
Figure 2:
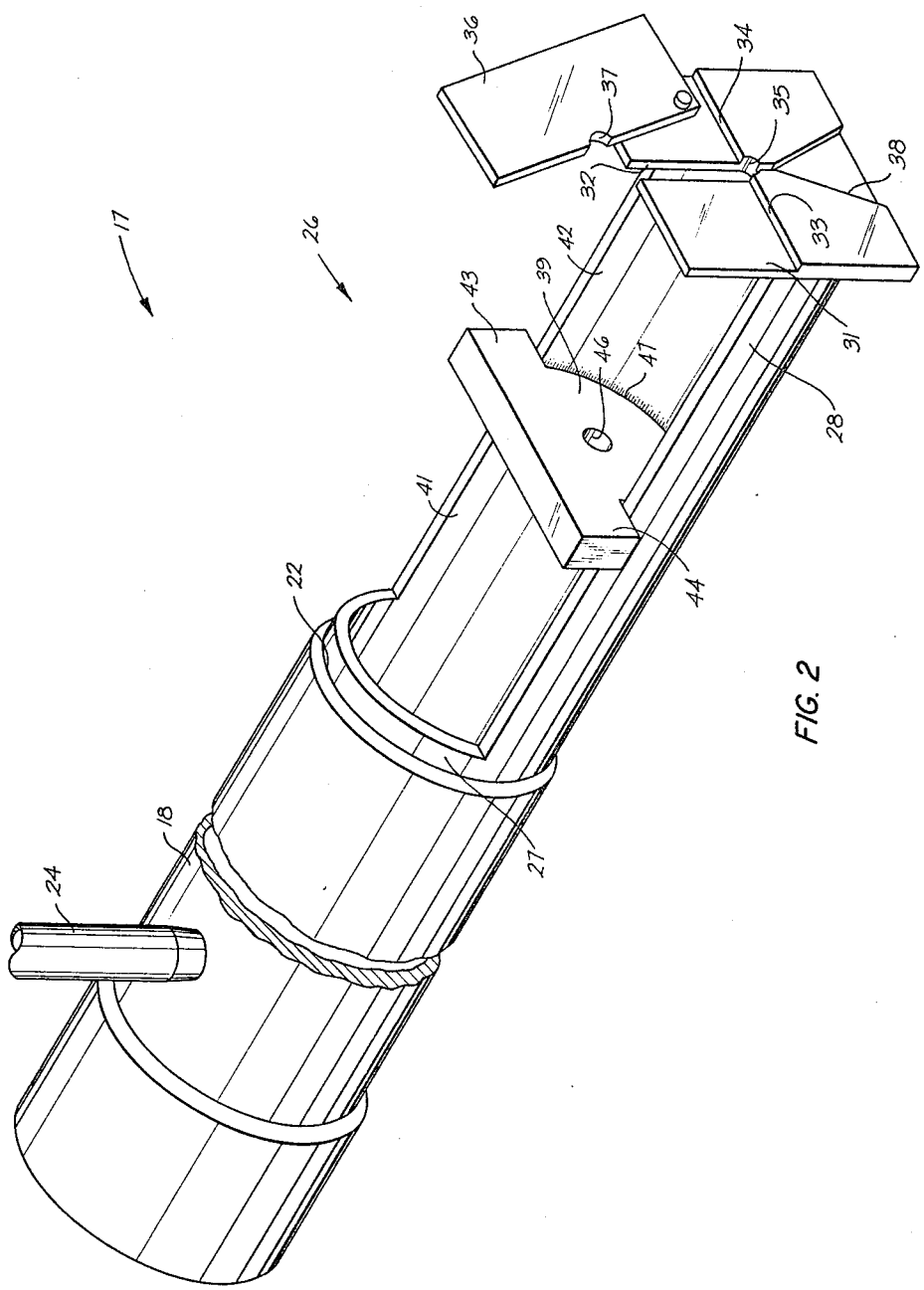
FIG. 2 is a perspective view of the cooling chamber extending from the cooling trough of FIG. 1.

A dual-compartmented, cooling chamber 26 is slidably positioned within the entry end 22 of the cooling tube 18 and receives the cooling medium 25 which is directed through the tube from the inlet 24. As shown in FIGS. 2 and 3, the cooling chamber 26 is cylindrical at one end 27 which is slidably inserted into the wire entry end 22 of the cooling head 18. The remaining portion 28 of the cooling chamber 26 is semicylindrical and is formed with a slot 29 in an intermediate portion of the base thereof near the cylindrical end 27 which facilitates adjustable control of the cooling medium velocity at the wire entry end of the cooling chamber 26.

Referring to FIG. 2, an end plate 31 having a slot 32 formed therein is secured to the semicylindrical end of the cooling chamber 26 so that the slot 32 extends vertically from the center of the plate 31 to the upper edge of the plate. The end plate 31 is further formed with a pair of shoulders 33 and 34 in a common plane on opposite sides of the base of the slot 32 and define a space 35 therebetween.

As further shown in FIG. 2, a cover plate 36 is formed with a notch 37 and is pivotally attached to the end plate 31 so that the cover plate can be pivoted downwardly to rest upon the shoulders 33 and 34 of the end plate. As the plate 36 rests upon the shoulders 33 and 34 of the end plate 31, the notch 37 of the plate 36 coincides with the space 35 between the shoulders, thereby forming a central wire entry port to facilitate the passage of the hot, insulated wire 16 through the base of the slot 32 and into the compartmented, cooling chamber 26. In addition, the end plate 31 is formed with a spew-like slot 38 which communicates with the space 35 between the shoulders 33 and 34 to facilitate the possible outflow of the cooling medium 25 from the chamber 26.

Figure 4:
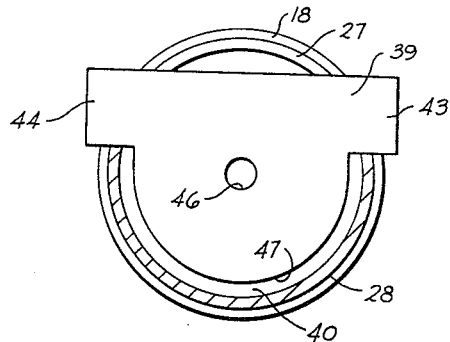
FIG. 4 is a view taken along lines 4—4 of FIG. 3 showing the structural arrangement of a separator within the cooling chamber.

Referring to FIGS. 2, 3 and 4, a separator 39 is positioned intermediately within the opening of the semicylindrical portion 28 of the cooling chamber 26 to provide a velocity control compartment 41 adjacent the cooling tube 18 and a wire entry compartment 42 between the separator and the end plate 31. The separator 39 is formed with a pair of flanges 43 and 44 which rest upon the upper edges of the semicylindrical portion 28 of the cooling chamber 26. In addition, the separator 39 is formed with an aperture 46 which is aligned with the opening formed by the cover plate notch 37 and the space 35, thereby facilitating a passage for the insulated wire 16 from the wire entry compartment 42 into the velocity control compartment 41. Further, as specifically viewed in FIG. 4, the separator 39 is formed with an arcuately shaped surface 47 which is positioned adjacent the inner semicylindrical wall of the cooling chamber 26. The surface 47 of the separator 39 is dimensioned to provide a space 40 between the arcuate surface of the separator and the inner, semicylindrical chamber wall to facilitate the passage of the cooling medium 25 through the space from the velocity control compartment 41 into the wire entry compartment 42.

As the cooling medium 25 enters the tube 18 through the inlet 24, a streamline flow is developed and substantially and continuously fills the tube so that turbulence and cavitation are not prevalent. The streamline flow of the cooling medium 25 is directed toward the tube side of the separator 39 where a substantial portion of the streamline medium engages the separator and overflows the upper edges of the velocity control compartment 41 and further exits through the slot 29 formed in the base of the compartment as viewed in FIG. 1. The portion of the cooling system 25 which overflows and exits from the velocity control compartment 41 flows into a container 48 where the medium is recirculated through the cooling system 17 by a pump (not shown). Hence, by using an enclosed tube 18 and, further, by providing a streamline flow of cooling medium 25, the wire 16 passing through the cooling medium is subjected to substantially equal pressures circumferentially about the jacketed wire rather than the uneven pressures prevalent in a turbulent and cavitating medium.

A small portion of the cooling medium 25 flows from the velocity control compartment 41 into the article entry compartment 42 through the space 40 adjacent the arcuate surface 47 of the separator 39. Since the space 40 is considerably smaller than the cross-sectional dimension of the chamber 26, the cooling medium 25 passing into the article entry compartment 42 is substantially reduced relative to the velocity of the streamline medium passing through the tube 18. Subsequently, the cooling medium 25 fills the article entry compartment 42 and overflows the upper edges of the compartment wherein components of the cooling medium are directed substantially upwardly from the base of the compartment in a direction substantially perpendicular to the axis of the jacketed wire 16 passing through the compartment. If the wire 16 is not passing through the article entry compartment 42, a streamline volume of water passing through the compartment at a low velocity exits through the wire entry port of the compartment at a relatively slow rate where the cooling medium passes through the spew-like slot 38 into the container 48.

When the hot jacketed wire is passed into the article entry compartment 42, as shown in FIGS. 6, 7 and 8, the velocity of the wire is sufficient to overcome the tendency of the cooling medium 25 to spew from the article entry port, thereby preventing a spew-like shower of cooling medium, as shown in FIG. 5, from exerting unequal pressure about the jacketed wire in the initial stages of the cooling procedure.

As shown in FIGS. 6, 7 and 8, the cooling medium 25 forms a substantially perpendicular curtain of cooling medium relative to the axis of the moving jacketed wire 16 where equal pressures of cooling medium are initially exerted about the continuously advancing jacketed wire. The velocity of the cooling medium 25 attempting to spew from the article entry port of the article entry compartment 42 must be sufficiently low to preclude spewing of the medium by the force of the wire 16 passing through the port and into the compartment. Hence, for a given speed of the jacketed wire 16 in a cooling and take-up procedure, the pressure of the medium exerted at the article entry port of the compartment 42 must be critically controlled to preclude any spewing of the medium from the article entry port.

In order to control the pressure of the cooling medium 25 at the article entry port of the compartment 42, the velocity of the medium entering the compartment through the space 40 must be controlled. To facilitate the control of the velocity of the cooling medium 25 entering the compartment 42, the cooling chamber 26 is slidable within the tube 18, thereby controlling the portion of the velocity control compartment 41 which is insertable into the tube and further, controlling the portion of the slot 29 insertable into the tube. In this manner, the volume of cooling medium 25 which is permitted to exit from the velocity control compartment 41 over the upper edges of the compartment and through the slot 29 is thereby controlled so that the velocity of the cooling medium passing from the compartment 41 into the article entry compartment 42 is also controlled. For example, if the cooling chamber 26 is inserted a substantial distance into the cooling tube 18 so that a portion of the velocity control compartment 41 is within the tube, the velocity of the cooling medium 26 entering the article entry compartment 42 is relatively high and sufficient pressure results at the article entry port of the compartment 42 to develop a cooling medium pattern about the entering wire 16, as shown in FIG. 6.

If the cooling chamber 26 is withdrawn so that a lesser portion of the velocity control compartment 41 is enclosed by the tube 18, the velocity of the cooling medium 25 entering the article entry compartment 42 is comparatively lower, whereby a cooling medium pattern about the wire 16 is developed, as shown in FIG. 7. Substantial withdrawal of the cooling chamber 26 from within the cooling tube 18 to a position as shown in FIGS. 1 and 2 results in a cooling medium pattern about the entering wire 16, as shown in FIG. 8. Hence, by controlling the velocity of the cooling medium 25 within the article entry compartment 42, the cooling medium can be precluded from spewing from the article entry port by moving the jacketed wire 16 at such a speed to overcome the spewing tendency of the cooling medium at the entry port. Further, the velocity of the cooling medium 25 within the article entry compartment 42 can be sufficiently controlled to provide various patterns of cooling medium about the entering jacketed wire 16, thereby providing an initial curtain of cooling medium to the jacketed wire where the curtain is substantially perpendicular to the wire axis.

*Operation*

Initially, the cover plate 36 is pivoted upwardly as shown in FIG. 2 to expose the end plate slot 32 to the extruder side of the cooling system 17. The leading end of the wire 16 which exits from the extruder head 13 is positioned within the base of the end plate slot 32 and is threaded through the separator aperture 46, the tube 18 and through the exit end 23 of the tube. Thereafter, the leading end of the wire 16 is wound onto the take-up reel (not shown) which is rotated to facilitate the take-up of the finished product. Further, the rotating reel provides the necessary means for moving the bare wire 14 through the extruder head 13 and for further moving the hot, insulated wire 16 through the cooling system 17. Subsequent to the initial threading operation, the cover plate 36 is pivoted downwardly and rests upon the spaced end plate shoulders 33 and 34 so that the cover plate notch 37 is positioned about the insulated wire 16, thereby forming the article entry port for the cooling chamber 26.

The cooling medium 25 then enters the tube 18 through the inlet 24 and the take-up reel is rotated to move the bare wire 14 through the extruder head 13 and the hot, insulated wire 16 through the cooling system 17. As the hot, insulated wire 16 approaches the cooling system 17, the wire initially engages the substantially prependicular curtain of cooling medium 25, as shown in FIGS. 6, 7 and 8, whereby a substantially even distribution of initial cooling is effected.

Further, the hot, insulated wire 16 passes through the cover plate notch 37 and into the article entry compartment 42 where the hot, soft material of the insulating jacket engages the streamline cooling medium 25 passing through the article entry compartment. Since the streamline cooling medium 25 exerts substantially minimal but equal pressures about the moving insulated wire 16, the insulating jacket of the wire hardens substantially as it passes through the streamline cooling medium in the article entry compartment. As the moving insulated wire 16 is cooled within the article entry compartment 42, the insulating jacket about the wire retains substantially a cross-sectional configuration set in the insulating material in the extruder head. This result is directly attributed to the exerted presence of equal pressures of the initial curtain and subsequent streamline cooling medium 25 upon the moving insulated wire 16 passing into and through the article entry compartment 42. Hence, the use of the cooling chamber 26 limits substantially the undersirable out-of-round and eccentricity deficiencies in the finished product.

Subsequently, the partially cooled insulated wire 16 passes from the article entry compartment 42 and into the velocity control comparment 41, and then through the cooling tube 18 where the insulating jacket is substantially hardened by the cooling action of the streamline cooling medium 25. As the insulated wire 16 moves through the cooling tube 18, the cooling procedure is completed and the insulated wire leaves the tube at the exit end 23 and is wound onto the take-up reel. Further, as the insulated wire 16 exits from the tube 18 at the exit end 23, as shown in FIG. 1, a small amount of the cooling medium 25 is carried with the insulated wire and flows into a container 49 for recirculation through the cooling system 17.

As previously discussed, in the manufacture of insulated wire 16 having an insulating jacket composed of expanded plastics, the insulated jacket expands as the product exits from the extruder head 13. To facilitate control of the expansion of the insulating jacket, it is necessary to cool the insulated wire 16 soon after it exits from the extruder head 13. Since the expanded plastic jacket is still in the forming stage, it is critically important that equal pressures be exerted upon the hot, expanding plastic during the initial cooling stages to preclude the possibility of out-of-round and eccentricity deficiencies in the finished product. The use of the cooling chamber 26 with the cooling tube 18 facilitates the cooling of the hot, insulated wire 16 having and expanded plastic jacket in the same manner as described in the cooling of non-expanding plastic insulating jackets by providing the initial perpendicular curtain of cooling medium at the article entry port of the chamber 26 and further providing a streamline flow of cooling medium throughout the cooling system 17. The importance of this cooling procedure is amplified when expanded plastic articles are to be cooled due to the necessity of controlling expansion of the article as well as cooling the article prior to take-up.

It is to be understood that the above-described arrangements are simply illustrative of the application of the principles of the invention, other arrangements may be devised by those skilled in the art which will embody the principles of the invention and fall within the spirit and scope of the invention.

What is claimed is:

1. A method of cooling a longitudinal plastic article, which comprises the steps of:
    developing a streamline liquid cooling medium within a first chamber,
    developing a streamline liquid cooling medium within a second chamber at a slower rate than the streamline liquid medium in the first chamber where the second chamber liquid cooling medium tends to spew from an article entrance, and
    moving the article initially into the second chamber at a rate to preclude spewing of the liquid cooling medium about the article entering the second chamber and then through the first chamber of liquid cooling medium.

2. A method of cooling a longitudinal plastic article, which comprises the steps of:
    circulating a streamline flow of liquid cooling medium within a first confined volume at a defined rate,
    directing a portion of the circulated liquid cooling medium from the first confined volume into a second confined volume at a slower streamline rate, and
    moving the article through an entrance and into the second confined volume of streamline liquid cooling medium at such a rate to preclude spewing of the liquid cooling medium from the article entrance onto the approaching article.

3. Apparatus for cooling a hot, plastic elongated article, which comprises:
    a cooling tube for receiving and facilitating the circulation of a streamline liquid cooling medium therethrough,
    a first means communicating with the tube for receiving and facilitating the circulation therethrough of the streamline liquid cooling medium,
    a second means restrictively communicating with the first means for receiving and facilitating the circulation therethrough of a portion of the streamline liquid cooling medium from the first means at a slower rate than the circulation of the liquid cooling medium in the first means, the second means formed with an article entrance slightly larger than the article where the velocity of the liquid cooling medium entering the second means is sufficiently lower than the velocity of the article entering the second means to preclude spewing of the liquid cooling medium about the approaching article as the article is moved successively through the second means, the first means and the cooling tube so that successive cross sections of the moving article engage initially the cooling medium in a plane perpendicular to the axis of the article whereby even cooling about the successive cross sections of the article is effected, and
    means for circulating the streamline cooling medium through the cooling tube, the first means and the second means.

4. Apparatus for cooling a hot moving plastic article, which comprises:
    a first means for receiving and facilitating the circulation of a circulating streamline liquid cooling medium therein,
    a second means communicating with the first means for receiving and facilitating the circulation of the streamline liquid cooling medium therein,
    means for circulating the liquid cooling medium through the first and second receiving means,
    means for restricting the streamline flow of the circulating liquid cooling medium from the first means to the second means so that the rate of liquid medium flow within the second means is less than the rate of flow in the first means, and
    means formed in the second means and the restricting means for facilitating the passage of the moving article through the first and second means, whereby the article engages initially the liquid cooling medium in the second means at such a rate to preclude spewing of the liquid cooling medium from within the second means onto the approaching article so that successive cross sections of the moving article engage initially the cooling medium in a plane perpendicular to the axis of the article whereby even cooling about the successive cross sections of the article is effected.

5. Apparatus for cooling a hot, soft, elongated plastic article, which comprises:
    a cooling tube,
    a cooling chamber having a first compartment communicating with the cooling tube and a second compartment communicating with the first compartment,
    the second chamber compartment formed with an entrance for facilitating the movement of the article therethrough,
    means for circulating a streamline liquid cooling medium through the cooling tube and the first and second compartments of the cooling chamber, and
    means for restrictively diverting portions of the streamline liquid cooling medium from the first compartment into the second compartment and for reducing the rate of flow of the streamline liquid cooling medium diverted to the second compartment so that the rate of movement of the article passing through the second compartment entrance is sufficient to preclude the streamline liquid cooling medium from spewing out of the article entrance so that successive cross sections of the moving article engage initially the cooling medium in a plane perpendicular to the axis of the article whereby even cooling about the successive cross sections of the article is effected.

6. Apparatus for cooling a hot, elongated plastic article, which comprises:
    a cooling tube for facilitating the circulation of a streamline liquid cooling medium therethrough,
    a first means communicating with the tube for receiving and facilitating the circulation therethrough of the streamline liquid cooling medium,
    a second means restrictively communicating with the first means for receiving and facilitating the circulation therethrough of a portion of the streamline liquid cooling medium from the first means at a slower rate than the liquid medium in the first means, the second means formed with an article entrance slightly larger than the article where the velocity of the liquid cooling medium entering the second means is sufficiently lower than the velocity of the article entering the second means to preclude spewing of the liquid cooling medium about the approaching article as the article is moved successively through the second means, the first means and the cooling tube, means for circulating the streamline cooling medium through the cooling tube, the first means and the second means, and adjustable means for controlling the rate of flow of the streamline liquid cooling medium within the first means and for controlling the rate of flow of the streamline liquid medium within the second means to establish a desired rate of the streamline liquid cooling medium within the second means to correspond to the velocity of the article entering the second means.

7. Apparatus for cooling a hot moving plastic article, which comprises:

a first means for receiving and facilitating the circulation of a circulating streamline liquid cooling medium therein, a second means communicating with the first means for receiving and facilitating the circulation of the streamline liquid cooling medium therein, means for circulating the liquid cooling medium through the first and second receiving means, means for restricting the streamline flow of the circulating liquid cooling medium from the first means to the second means so that the rate of liquid cooling medium flow within the second means is less than the rate of flow in the first means, means formed in the second means and the restricting means for facilitating the passage of the moving article through the first and second means, whereby the article engages initially the liquid cooling medium in the second means at such a rate to preclude spewing of the liquid cooling medium from within the second receiving means onto the approaching article so that successive cross sections of the moving article engage initially the cooling medium in a plane perpendicular to the axis of the article whereby even cooling about the successive cross sections of the article is effected, and adjustable means for controlling the rate of streamline liquid cooling medium within the first means and for controlling the liquid cooling medium rate within the second means.

8. Apparatus for cooling a hot, soft, elongated plastic article, which comprises:

a cooling tube, a cooling chamber positioned within one end of the cooling tube and having a first compartment communicating with the cooling tube and a second compartment communicating with the first compartment, means for circulating a streamline liquid cooling medium through the cooling tube and the first and second chamber compartments, the first compartment formed with at least one opening to facilitate the circulation of the liquid medium in the first compartment, the second chamber compartment formed with an opening to facilitate the circulation of the liquid cooling medium therethrough and an entrance for facilitating the movement of the article therethrough, means for restrictively diverting portions of the streamline liquid cooling medium from the first compartment into the second compartment and for reducing the rate of flow of the streamline liquid cooling medium diverted to the second compartment so that the rate of movement of the article passing through the second compartment entrance is sufficient to preclude the streamline liquid cooling medium from spewing out of the article entrance, and the cooling chamber being slidably adjustable within the cooling tube to facilitate adjustment of the first compartment opening relative to the cooling tube to control the rate of flow of the streamline liquid cooling medium from the first compartment to the second compartment, thereby providing an adjustable control for the rate of flow of the streamline liquid cooling medium in the second compartment.

9. Apparatus for cooling a hot moving plastic article, which comprises:

a cylindrical cooling tube for facilitating the passage of a streamline liquid cooling medium therethrough, a cooling chamber having a cylindrical end portion, the remaining portion of the cooling chamber being substantially semicylindrical to facilitate the circulation of the liquid cooling medium therethrough, the cylindrical section of the cooling chamber being slidably positioned within one end of the cylindrical cooling tube and being open to communicate with the cooling tube, the end of the semicylindrical portion of the chamber having a closure, means positioned intermediately within the semicylindrical portion of the chamber for forming a first compartment communicating with the cooling tube and a second compartment adjacent the end closure, means for restricting the flow of the streamline liquid of cooling medium from the first compartment to the second compartment, means for circulating the streamline liquid cooling medium through the cooling tube and the first chamber compartment communicating with the cooling tube and into the second compartment through the restricting means so that the liquid cooling medium is circulated through the second compartment at a slower rate than the circulating liquid cooling medium of the first compartment, and the end closure and the restrictor being formed with openings to facilitate the passage of the hot moving article successively through the second chamber, the first chamber and the cooling tube.

10. Apparatus for cooling a hot moving plastic article, which comprises:

a cylindrical cooling tube for facilitating the passage of a streamline liquid cooling medium therethrough, a cooling chamber having a cylindrical end portion, the remaining portion of the cooling chamber being substantially semicylindrical to facilitate the circulation of the streamline liquid cooling medium therethrough, the cylindrical section of the cooling chamber being slidably positioned within one end of the cylindrical cooling tube and being open to communicate with the cooling tube, the end of the semicylindrical portion of the chamber having a closure, a restrictor positioned intermediately within the semicylindrical portion of the chamber to form a first compartment communicating with the cooling tube and a second compartment between the restrictor and the chamber end closure, the restrictor formed with an arcuate surface adjacent and spaced from the inner semicylindrical wall of the chamber to form a slot therebetween, means for circulating the streamline liquid cooling medium through the cooling tube, the first chamber compartment and through the slot formed between the arcuate surface of the restrictor and the semicylindrical wall so that the liquid cooling medium is circulated through the second compartment at a slower rate than the circulating liquid cooling medium of the first compartment, and the end closure and the restrictor being formed with openings to facilitate the passage of the hot moving article successively through the second chamber, the first chamber and the cooling tube.

11. Apparatus for cooling a hot moving plastic article, which comprises:

a cylindrical cooling tube for facilitating the circulation of a streamline liquid cooling medium therethrough, a cooling chamber having a cylindrical end portion, the remaining portion of the cooling chamber being substantially semicylindrical to facilitate the circulation of the streamline liquid cooling medium therethrough, the cylindrical end of the cooling chamber being slidably positioned in one end of the cylindrical cooling tube, the end of the semicylindrical portion of the chamber having a closure, means positioned intermediately within the semicylindrical portion of the chamber for forming a first compartment communicating with the cooling tube and a second compartment adjacent the end closure, means for circulating the streamline liquid cooling medium through the cooling tube, the first chamber compartment and the second compartment, means for restricting the flow of the streamline liquid cooling medium from the first compartment to the second compartment, whereby the restricting means develops a slower rate of streamline liquid cooling medium flow in the second compartment relative to the rate of flow of the first compartment cooling medium, a slot formed in an intermediate portion of the bottom of the first compartment for facilitating the circulation of the streamline liquid cooling medium through the compartment, whereby the cooling medium rate of flow through the chamber may be adjusted by positioning the cooling chamber within the cooling tube to restrict the size of the slot opening, and the second compartment end closure and the restricting means being formed with openings to facilitate the passage of the hot moving article successively through the second chamber, the first chamber and the cooling tube, whereby the cooling chamber is adjustable to develop a streamline liquid cooling medium velocity in the second compartment which is sufficiently below the velocity of the moving article to preclude spewing of the cooling medium onto the article.

12. Apparatus for cooling a hot moving plastic article, which comprises:

a cylindrical cooling tube for facilitating the circulation of a streamline liquid cooling medium therethrough, a cooling chamber having a cylindrical end portion, the remaining portion of the cooling chamber being substantially semicylindrical to facilitate the circulation of the streamline liquid cooling medium therethrough, the cylindrical end of the cooling chamber being slidably positioned in one end of the cylindrical cooling tube, the end of the semicylindrical portion of the chamber having a closure, a restrictor positioned intermediately within the semicylindrical portion of the chamber to form a first compartment communicating with the cooling tube and a second compartment between the restrictor and the chamber end closure, the restrictor formed with an arcuate surface adjacent and spaced from the inner semicylindrical wall of the chamber to form a slot therebetween, means for circulating the streamline liquid cooling medium through the cooling tube, the first chamber compartment and through the slot formed between the arcuate surface of the restrictor and the semicylindrical wall so that the cooling medium is circulated through the second compartment at a slower rate than the circulating cooling medium of the first compartment, a slot formed in an intermediate portion of the bottom of the first compartment for facilitating the circulation of the streamline liquid cooling medium through the compartment, whereby the cooling medium rate of flow through the chamber may be adjusted by positioning the cooling chamber within the cooling tube to restrict the size of the slot opening, and the second compartment end closure and the restricting means being formed with openings to facilitate the passage of the hot moving plastic article successively through the second chamber, the first chamber and the cooling tube, whereby the cooling chamber is adjustable to develop a cooling medium velocity in the second compartment which is sufficiently below the velocity of the moving article to preclude spewing of the streamline liquid cooling medium onto the article.

References Cited by the Examiner

UNITED STATES PATENTS

| | | | |
|---|---|---|---|
| 2,287,825 | 6/1942 | Postlewaite | 25—38 |
| 2,695,421 | 11/1954 | Amundson et al. | 118—405 X |
| 2,708,843 | 5/1955 | Gibson et al. | 34—242 X |
| 2,775,825 | 1/1957 | Phillips | 34—242 |
| 2,889,806 | 6/1959 | Conant | 118—69 X |
| 3,043,715 | 7/1962 | Clough | 118—69 X |

ROBERT A. O'LEARY, *Primary Examiner.*

W. E. WAYNER, *Assistant Examiner.*